United States Patent
Oumi et al.

(10) Patent No.: US 6,587,426 B1
(45) Date of Patent: Jul. 1, 2003

(54) RECORDING MEDIUM HAVING INFORMATION REPRODUCIBLE USING NEAR-FIELD LIGHT

(75) Inventors: Manabu Oumi, Chiba (JP); Yasuyuki Mitsuoka, Chiba (JP); Norio Chiba, Chiba (JP); Nobuyuki Kasama, Chiba (JP); Kenji Kato, Chiba (JP); Takashi Niwa, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/495,275

(22) Filed: Jan. 31, 2000

(30) Foreign Application Priority Data

Feb. 3, 1999 (JP) .............................. 11-26728

(51) Int. Cl.$^7$ ................................. G11B 7/24
(52) U.S. Cl. ................................. 369/275.3
(58) Field of Search ................ 369/275.3, 275.4, 369/284, 285, 112.01, 275.2, 283, 43; 430/270.13

(56) References Cited

U.S. PATENT DOCUMENTS 5,815,484 A * 9/1998 Smith et al. ............ 369/100
6,329,036 B1 * 12/2001 Kikukawa et al. ........ 428/64.1

* cited by examiner

Primary Examiner—Paul W. Huber
Assistant Examiner—Kimlien T Le
(74) Attorney, Agent, or Firm—Adams & Wilks

(57) ABSTRACT

A recording medium and near-field optical probe utilizing near-field light to achieve high density of information recording and hence enhance resolution in reproducing.

A phase shift arrangement layer is formed arranged alternately with a phase shifter region to cause shift by 180 degrees in incident light and a transmission region transparent for a wavelength of the incident light. Furthermore, a row of data marks are arranged in a position above the phase shifter regions and transmission region. Due to this, cancellation is made between spread of near-field light due to incident light transmitted through the phase shifter region and spread of near-field light due to incident light transmitted through the transmission region, providing sharpness in an intensity distribution of near-field light over the data mark. Also, a phase shifter is provided at a through-hole of the near-field optical probe, enabling to produce more localized near-field light.

2 Claims, 13 Drawing Sheets

RECORDING MEDIUM
SECTIONAL VIEW

INCIDENT LIGHT

NEAR-FIELD LIGHT
AMPLITUDE DISTRIBUTION
(ON MEDIUM SURFACE)

NEAR-FIELD LIGHT
AMPLITUDE DISTRIBUTION
(AT MICROSCOPIC APERTURE)

NEAR-FIELD LIGHT
INTENSITY DISTRIBUTION
(AT MICROSCOPIC APERTURE)

RECORDING MEDIUM
SECTIONAL VIEW

NEAR-FIELD LIGHT
AMPLITUDE DISTRIBUTION
(ON MEDIUM SURFACE)

NEAR-FIELD LIGHT
AMPLITUDE DISTRIBUTION
(AT MICROSCOPIC APERTURE)

NEAR-FIELD LIGHT
INTENSITY DISTRIBUTION
(AT MICROSCOPIC APERTURE)

RECORDING MEDIUM
SECTIONAL VIEW

INCIDENT LIGHT

NEAR-FIELD LIGHT
AMPLITUDE DISTRIBUTION
(ON MEDIUM SURFACE)

NEAR-FIELD LIGHT
AMPLITUDE DISTRIBUTION
(AT MICROSCOPIC APERTURE)

NEAR-FIELD LIGHT
INTENSITY DISTRIBUTION
(AT MICROSCOPIC APERTURE)

F I G. 9
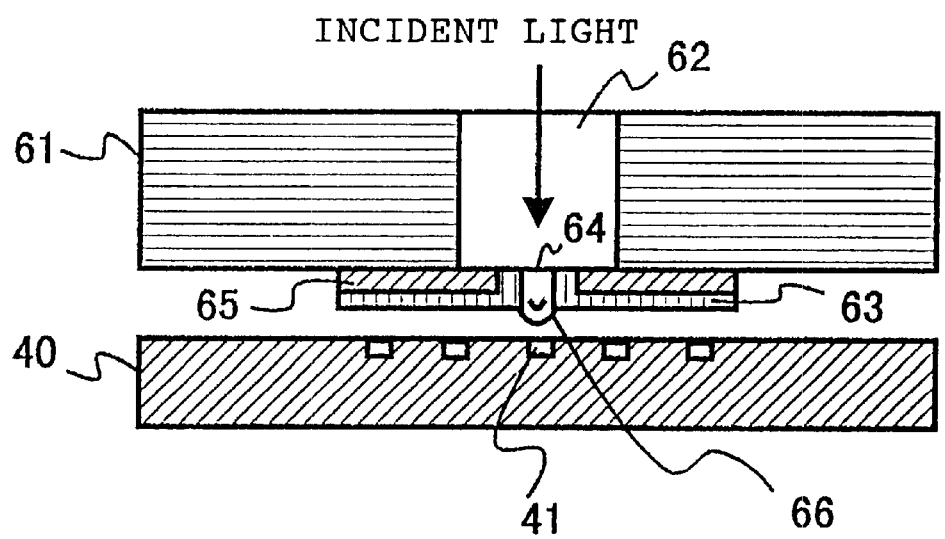

NEAR-FIELD LIGHT
AMPLITUDE DISTRIBUTION
(AT MICROSCOPIC APERTURE)

NEAR-FIELD LIGHT
AMPLITUDE DISTRIBUTION
(ON MEDIUM SURFACE)

NEAR-FIELD LIGHT
INTENSITY DISTRIBUTION
(ON MEDIUM SURFACE)

RECORDING MEDIUM
SECTIONAL VIEW

INCIDENT LIGHT

NEAR-FIELD LIGHT
AMPLITUDE DISTRIBUTION
(ON MEDIUM SURFACE)

NEAR-FIELD LIGHT
AMPLITUDE DISTRIBUTION
(AT MICROSCOPIC APERTURE)

NEAR-FIELD LIGHT
INTENSITY DISTRIBUTION
(AT MICROSCOPIC APERTURE)

RECORDING MEDIUM HAVING INFORMATION REPRODUCIBLE USING NEAR-FIELD LIGHT

BACKGROUND OF THE INVENTION

This invention relates to a recording medium reproducible by utilizing near-field light and a near-field optical probe for reproducing information recorded on such a recording medium and, more particularly to a recording medium and near-field optical probe that enhances reproducing resolution for information recorded with density.

In recent years, remarkable development has been made in optical reproducing apparatuses (DVD players, etc.) for reproducing information on recording media by illuminating laser light. However, the information recording density has reached a limitation because of a presence of a diffraction limit of laser light. In an attempt to break through such diffraction limit, a proposal has been made on a near-field light reproducing apparatus using an optical head provided with a microscopic aperture having a diameter of less than a wavelength of laser light to be utilized in reproducing so that near-field light (including both near field and far field) produced at the microscopic aperture or on a surface of the recording medium can be utilized, thereby increasing reproducible information recording density.

Conventionally, the near-field microscopes using a probe (hereinafter referred to as a near-field optical probe) having a microscopic aperture as mentioned above as an apparatus utilizing near-field light have been utilized for observing sample microscopic surface textures. As one of schemes utilizing near-field light in the near-field microscopes, there is a scheme that the near-field optical probe microscopic aperture and the sample surface are approached in distance to nearly a diameter of the near-field optical probe microscopic aperture so that near-field light can be produced at the microscopic aperture by introducing propagation light through the near-field optical probe and toward the near-field optical probe microscopic aperture (illumination mode). In this case, scattering light caused by the interaction between the produced near-field light and the sample surface involving an intensity and phase reflecting a sample surface microscopic texture is detected by a scattering light detection system. Thus, high resolution of observation is made feasible that could not be achieved by the conventional optical microscopes.

There is another scheme of the near-field microscopes utilizing near-field light that propagation light is illuminated toward a sample to localize near-field light over the sample surface wherein a near-field optical probe microscopic aperture is approached to the sample surface to nearly a diameter of the near-field optical probe microscopic aperture (collection mode). In this case, scattering light cause by the interaction between the localized near-field light and the near-field optical probe microscopic aperture involving an intensity and phase reflecting a sample surface microscopic texture is guided to a scattering light detection system through the near-field optical probe microscopic aperture, thus achieving observation with high resolution.

As a near-field microscope, Japanese Patent Laid-open No. 174542/1995, for example, has been proposed disclosing a scanning near-field atomic force microscope. This scanning near-field atomic force microscope adopts as near-field optical probe an optical waveguide sharpened at a tip to perform probe access control and scanning control for the atomic force microscope (AFM) thereby enabling observation of sample surface topology and optical characteristics. FIG. 11 is a block diagram showing a schematic configuration of the scanning near-field atomic force microscope.

In FIG. 11, a scanning near-field atomic force microscope 80 has, above a probe 89, a laser light source 83, a focus lens 84, a mirror 85 and a photoelectric conversion element 86 vertically divided into two. The light emitted from the laser light source 83 is collected by the focus lens 84 onto a probe top surface 82 so that the light reflected thereon is guided to the photoelectric conversion element 86 via the mirror 85. Meanwhile, the light emitted from a light source 94 for light information measurement is illuminated through a collimate lens 95 to a backside of a recording medium 81 over a prism 92 having a slant face treated for total reflection. Then, the light is guided to the other end of the probe 89 (not-sharpened base) that is proximate to the recording medium 81 and introduced to the photoelectric conversion element 87.

The prism 92 and recording medium 81 are set up on a rough movement mechanism 97 and fine movement mechanism 96 movable in XYZ directions. The signal detected by the photoelectric conversion element 86 is sent to a servo mechanism 93. Based on the signal, the servo mechanism 93 controls the rough movement mechanism 97 and fine movement mechanism 96 so that the deflection on the probe 89 cannot exceed a prescribed value when approaching of the probe 89 to the recording medium 81 or reading out data. The servo mechanism 93 is connected with a computer 99 to control operation of the fine movement mechanism 96 in a planar directions and receive information about the recording medium from a control signal of the servo mechanism 93. Meanwhile, when applying modulation to the light of the light source 94 or providing vibration by a vibration mechanism 88 to between the probe 89 and the recording medium 81, the signal obtained in the photoelectric conversion element 87 is connected to an analog input interface of the computer 99 via a lock-in amplifier 98 to detect optical information in synchronism with planar action of the fine movement mechanism 96. When no modulation or the like is applied to the light source 94, the signal obtained in the photoelectric conversion element 87 is directly connected to the analog input interface of the computer 99 without being passed through the lock-in amplifier 98.

The above near-field optical information reproducing apparatus utilizes the near-field microscope technology and observation scheme, and can reproduce information densely recorded on a recording medium by utilizing near-field light.

However, where the recording medium is increased in recording density by arranging data marks as information units in a close relationship, when conducting reproducing with the recording medium there encounters difficulty for the near-field optical probe used in the conventional near-field optical information reproducing apparatus to individually recognize and detect adjacent ones of the data marks. This problem is explained hereinbelow on an example of a near-field optical probe of a near-field optical information reproducing apparatus for information reproducing on the collection mode. FIG. 12 shows a recording medium 100 arranged with data marks 101 to produce near-field light. Incidentally, FIG. 12 shows one part of the recording medium 100 wherein the dotted circle 102 signifies a position that a data mark is possible to provide.

In FIG. 12 the data marks 101 are different in optical transmittance or refractive index, for example, from a base member 103 of the recording medium 100. The difference in optical property enables recognition of the presence or absence of a data mark 101. That is, in the data mark 101 the near-field light produced on a surface of the recording medium 100 is different in intensity or the like from that of the base material 103, which realizes to reproduce information configured by the data mark 101. Here, the near-field light on the surface of the recording medium 100 is produced by illuminating incident light, such as laser light, at a backside (surface not having data marks) of the recording medium 100 under a condition of total reflection. Incidentally, recording onto the data mark 101 is possible to realize by a phase change recording method or the like in the currently-marketed rewritable recording mediums.

FIG. 13 shows a relationship between a sectional view of the recording medium 100 taken on line D–D' in FIG. 12 and near-field light produced by the data marks 101. Meanwhile, in FIG. 13, a near-field optical probe 110 is arranged above the recording medium 100. The near-field optical probe 110 moves in a rightward direction in the figure as scanning directions to sequentially detect near-field light produced through the data marks 101 of the recording medium 100. For example, provided that in FIG. 13 the regions recorded with a data mark 101 (101a, 101b, 101c) are taken as "1" while those not recorded with a data mark 101 is as "0", a signal will be reproduced as "01101" from left of the figure.

Accordingly, the amplitude of near-field light in positions fully close to the corresponding data marks 101a, 101b, 101c to "1" can be expressed rectangular, in an ideal case, as represented in a near-field light amplitude distribution of FIG. 13 (on medium surface). With respect to this, a near-field light amplitude distribution (at microscopic opening) of FIG. 13 shows a near-field light amplitude distribution of near-field light reaching a microscopic aperture 111 of the near-field optical probe 110, i.e. at a position that a given distance is provided between the data mark 101 and the near-field optical probe 110. Each data mark 101 has a spread smoothly attenuating left and right with a maximum point given on a center axis of the data mark.

Meanwhile, a near-field light intensity distribution (at microscopic aperture) of FIG. 13 illustrates a near-field light intensity distribution offered by the above near-field light amplitude distribution (at microscopic aperture). As is shown, near-field light produced through the adjacent data marks 101a and 101b at a position reaching the microscopic aperture 111 of the near-field optical probe 110 overlaps at respective foots of near-field light amplitude. This results in an obscured boundary between near-field light produced through the data mark 101a and near-field light produced through the data mark 101b, thus lowering resolution in reproducing. Thus, the data marks are difficult to separately recognize in the microscopic aperture 111 position of the near-field optical probe 110.

The near-field optical information reproducing apparatus is to ultimately detect a data mark 101 or reproduce information by guiding, into a near-field optical probe, scattering light (propagation light) obtained by scattering near-field light reaching the microscopic aperture 111 of the near-field optical probe 110. Consequently, the problem with data mark separation is not negligible. This problem might be avoided by providing full spacing between the data marks 101. This however decreases recording density on the recording medium, impairing high-density recording medium reproducing as a merit of near-field optical information reproducing apparatus.

Meanwhile, in illumination-mode information reproducing, in order to separately recognize individual data marks densely arranged on a recording medium, it is possible to decrease a localization range of near-field light caused at the microscopic aperture by reducing the size of the microscopic aperture of the near-field optical probe. However, a high level technology is required to make smaller microscopic aperture. There encounters a problem that a decreased localized range of near-field light is also decreased in intensity and hence difficult to detect.

SUMMARY OF THE INVENTION

It is an object of the present invention to provide a recording medium and near-field optical probe which can achieve high density information recording and enhance resolution in reproducing.

In order to achieve the above object, a first recording medium according to the present invention is a recording medium formed on a recording medium surface with information reproducible by utilizing near field light, comprising: a medium base member transparent for a wavelength of illumination light (incident light) to be illuminated to produce the near field light; a phase shifter arrangement layer arranged alternately, in a direction parallel with a surface of the medium base member and in a reproducing direction of the information, with transmission regions transparent for the wavelength of the illumination light and phase shifter regions transparent for the wavelength of the illumination light to cause a shift of phase in the illumination light by 180 degrees; and a data mark arrangement layer formed on the phase shifter arrangement layer and having data marks as units of the information respectively corresponding one by one to the transmission regions and the phase shifter regions.

According to this invention, on a base member (medium base member) having a sufficient transmittance for a wavelength of incident light to be illuminated at the backside of the recording medium where a near field light information reproducing apparatus adopts a collection mode as a reproducing scheme, a phase shift arrangement layer is provided which is formed alternately with a phase shifter region transparent for the wavelength of the incident light to be illuminated at the backside of the recording medium under a condition of total reflection to cause a 180-degree shift of phase in the incident light and a transmission region transparent for the wavelength of the incident light. Furthermore, a data mark arrangement layer is formed that a row of data marks can be arranged in positions on the phase shifter regions and transmission regions. It is therefore possible to cause cancellation between spread of near field light caused on the recording medium due to incident light transmitted through the phase shifter regions and spread of near field light caused on the recording medium due to incident light transmitted through the transmission regions.

Also, in a second recording medium of the invention, in the first recording medium the data mark arrangement layer has a shade film formed on a surface thereof in regions except for those having the data marks, to shade from the illumination light.

According to the invention, the shade film is coated on the surface of the data mark arrangement layer in areas except for the data marks and those where data marks are possible to provide. Accordingly, near-field light only is obtained on the surface of the recording medium for illumination light incidence under other conditions than total reflection.

Also, a third recording medium according to the present invention is a recording medium formed on a recording medium surface with information reproducible by utilizing near field light, comprising: a medium base member transparent for a wavelength of illumination light to be illuminated to produce the near field light; a phase shifter translucent for the wavelength of the illumination light to cause a shift of phase in the illumination light by 180 degrees; wherein the phase shifter is provided on a surface of the medium base member in areas except those for producing the near field light and having data marks as units of the information.

According to this invention, on a base member (medium base member) having a sufficient transmittance for a wavelength of illumination light (laser light or the like) to be illuminated at the backside of the recording medium where a near field light information reproducing apparatus adopts a collection mode as a reproducing scheme, a phase shifter is coated, which is translucent for the wavelength of illumination light to be illuminated at the backside of the recording medium to cause a 180-degree shift of phase in the laser light wherein an opening not coated with the phase shifter is arranged as a data mark as information unit. It is therefore possible to cancel between spread at data mark edges of near field light caused through the data mark and spread at phase shifter edges of near field light.

Also, a first near field optical probe according to the present invention is a near field optical probe having a microscopic aperture for producing near field light, comprising: a planar substrate formed with a through-hole; and a phase shifter translucent for a wavelength of illumination light to be illuminated for producing the near field light to cause a shift of phase in the illumination light by 180 degrees; wherein the phase shifter is provided in a manner closing one opening of the through-hole to have the microscopic aperture.

According to this invention, the phase shifter is formed at the opening of the through-hole of the near field optical probe which is translucent for a wavelength of laser light (illumination light) to be introduced to the through-hole to cause a 180-degree shift of phase in the laser light. Furthermore, the microscopic aperture is formed in the phase shifter to have an appropriate diameter for producing near field light. Accordingly, in the case that the reproducing scheme to be adopted in a near field light information reproducing apparatus is taken an illumination mode, cancellation is made between spread in near field light produced through the microscopic aperture and spread in propagation light transmitted through the phase shifter, at their respective edges.

Also, a second near field optical probe according to the present invention is a near field optical probe having a microscopic aperture for producing near field light, comprising: a planar substrate formed with a through-hole; a shade film opaque for a wavelength of illumination light to be illuminated for producing the near field light; and a phase shifter transparent for the wavelength of the illumination light to be illuminated for producing the near field light to cause a shift of phase in the illumination light by 180 degrees; wherein the shade film is provided in a manner closing one opening of the through-hole to have a first microscopic aperture for producing the near field light; and the phase shifter being provided in a manner closing the first microscopic aperture to have a second microscopic aperture smaller than said first microscopic aperture.

According to this invention, the first microscopic aperture for producing near field light is formed by locally coating the shade film. The phase shifter is formed in a manner closing the first microscopic aperture, which is transparent for a wavelength of laser light (illumination light) to be introduced to the through-hole to cause a 180-degree shift of phase in the laser light. The second microscopic aperture is provided in the phase shifter. Accordingly, in the case that the reproducing scheme to be adopted in a near field light information reproducing apparatus is taken an illumination mode, cancellation is made between spread in near field light produced through the first microscopic aperture and spread in second near field light transmitted through the phase shifter, at their respective edges. Thus, it is possible to obtain near field light with sharpness.

BRIEF DESCRIPTION OF THE DRAWINGS

FIG. 9 is a schematic structural view showing a near-field optical probe according to Embodiment 5;

DETAILED DESCRIPTION OF THE PREFERRED EMBODIMENTS

Embodiments of the present invention will now be described with reference to the accompanying drawings, which is on recording medium to be reproduced utilizing near-field light and information reproducing apparatus therefor. Note that the invention is not limited by the embodiments.

Embodiment 1

Figure 1:
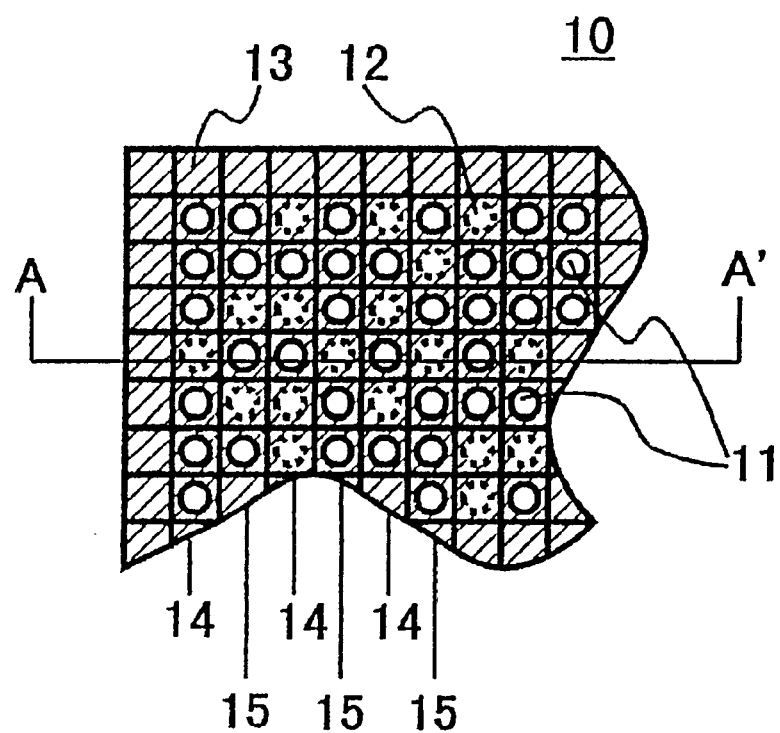
FIG. 1 is an illustrative view showing one part of a recording medium according to Embodiment 1.

Referring to FIG. 1, there is illustrated one part of a recording medium according to Embodiment 1 of the present invention. A recording medium 10 in the figure includes a substrate having a sufficient transmittance of light to produce near-field light, on which is formed a phase shifter arrangement layer, hereinafter referred to. Furthermore, a data mark arrangement layer is formed on the phase shifter arrangement layer. Herein, the data mark arrangement layer is a region to be formed with a data mark.

In FIG. 1, the recording medium 10 has a data mark arrangement layer to be formed with data marks 11 serving as the light transmittance regions to produce comparatively intense near-field light, for example. The proper arrangement of data marks 11 makes possible to achieve information recording. Note that in the figure the circle 12 depicted by a dotted line represents a position that a data mark is possible to provide therein. It is assumed herein that the data mark 11 corresponds to information of a logical value "1" while the dotted circle 12, or area having no data mark 11, to a logical value "0".

In this embodiment, the data mark 11 is provided by a material or physical structure that near-field light to be produced can be intensified by a difference in refractive index or optical absorbance from that of the area (dotted circle 12) having no data mark 11. Alternatively, it may be of other materials or physical structures that is to be distinguished based upon a difference in optical property, such as polarizing light direction and absorption coefficient.

As shown in FIG. 1, a shade film 13 is coated over a surface in areas except for those to have data marks 11, in order to prevent incident light from appearing at a surface that is illuminated at a backside of the recording medium 10. This shade film 13 eliminates the necessity of precisely controlling a direction of incident light illuminated to the recording medium 10 at the backside, without providing especial total reflection conditions.

The phase shifter arrangement layer positioned underlying the data mark arrangement layer, as illustrated, is in an arrangement alternate with a phase shifter region 14 and a transmission region 15 having no phase shifter. The transmission region 15 is preferably formed of a same material as the recording medium 10, i.e. a transparent material transmissible of incident light. The data marks 11 are arrayed in lengthwise rows of the phase shifter region 14 and transmission regions 15, depending upon information to be recorded. It however is noted that the data marks 11 are to be detected of presence or absence with respect to a vertical direction to a lengthwise direction of the phase shifter regions 14 and transmission regions 15.

Here, the phase shifter region is formed of a transparent material having a sufficiently great transmittance for a wavelength of incident light illuminated at a backside of a recording medium 10 to have a phase difference of 180 degrees with respect to a base member of the recording medium 10, e.g. applied glass film or sputtered $SiO_2$ film.

Figure 2:
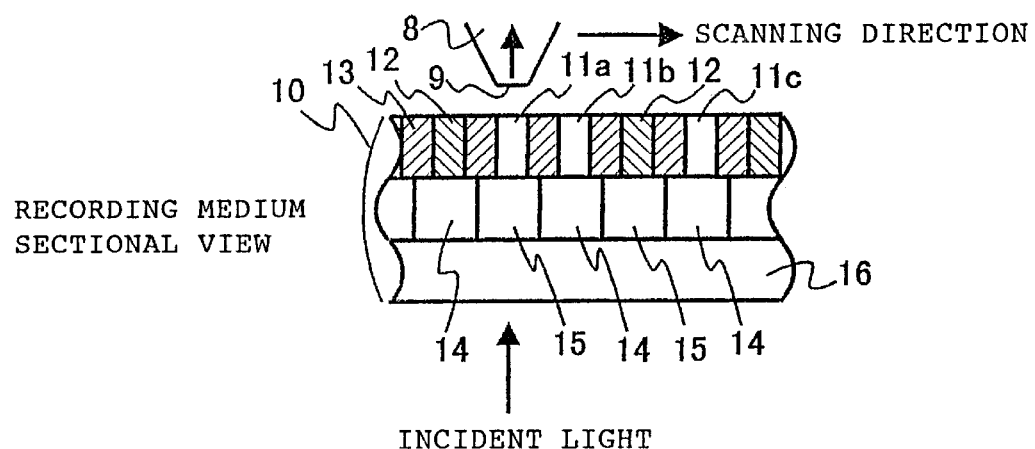
FIG. 2 is an illustrative representation showing a relationship between a sectional view of the recording medium taken on line A–A' in FIG. 1 and near-field light produced through data marks thereof.
Figure 2:
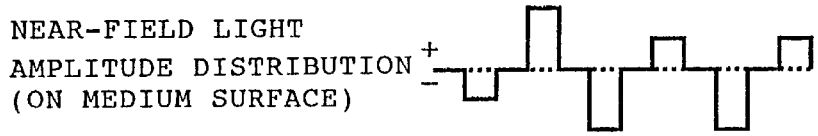
Figure 2:
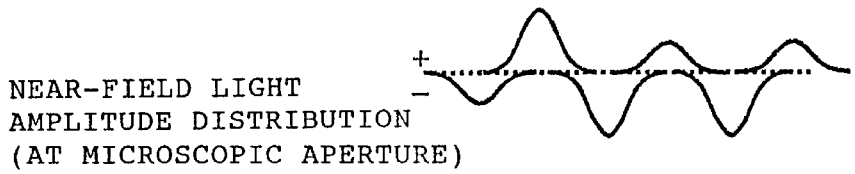
Figure 2:
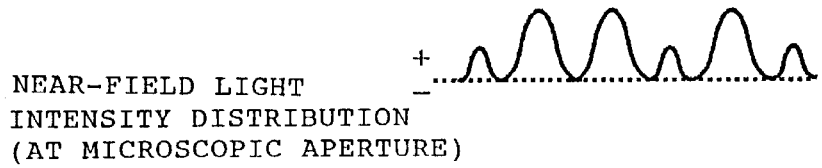

Referring to FIG. 2, there is illustrated a figure showing a relationship between a sectional view of the recording medium 10 taken on line A–A' in FIG. 1 and near-field light produced by the data marks 11. In the figure, the recording medium 10 is structured by a base member 16 formed of a sufficiently transmissible material of incident light under conditions other than total reflection, a phase shifter arrangement layer formed on the base member, and a data mark arrangement layer formed thereon.

Also, in FIG. 2 a near-field optical probe 8 is arranged above the recording medium 10. The near-field optical probe 8 moves in a rightward direction of the figure as a scanning direction, to thereby detect near-field light produced at the data marks 11 arranged on the recording medium 10 in a sequential fashion. Assuming for example that data mark 11 recorded regions (11a, 11b, 11c) are given "1" and data mark 11 non-recorded regions "0", a signal will be produced as "01101" with respect to a left-to-right direction of the figure in regions shown in FIG. 2.

Accordingly, near-field light positioned fully close to the data marks 11a, 11b, 11c each corresponding to "1" has an amplitude that can be expressed as a rectangular wave, as ideally shown in near-field light amplitude distribution (on medium surface) of FIG. 2. Here, in the near-field light amplitude distribution (on medium surface), in a minus region is exhibited a near-field light produced due to transmission through the phase shifter region 14. That is, near-field light produced over the phase shifter region 14 is inverted in phase by 180 degrees with respect to near-field light produced due to transmission through the transmission region 15.

With respect to this, a near-field light amplitude distribution (at microscopic aperture) of FIG. 2 shows an amplitude distribution of near-field light reaching a microscopic aperture 9 of the near-field optical probe 8, i.e. near-field light in a position that a given distance is provided between the data mark 11 and the near-field probe 8. In this near-field light amplitude distribution (at microscopic opening), illustrated is a distribution having spreads smoothly attenuated left and right with maximum points given on data-mark center axes, i.e. in the plus region concerning the data mark 11a and in the minus region concerning the data marks 11b and 11c.

Meanwhile, a near-field light intensity distribution (at microscopic aperture) of FIG. 2 shows a near-field light intensity distribution offered by the above-stated near-field light amplitude distribution (at microscopic aperture). That is, shown is an absolute value of a sum of a near-field light amplitude caused on the surface of the recording medium 10 due to incident light passed through the transmission regions 15 and a near-field light amplitude caused on the surface of the recording medium 10 due to incident light passed through the phase shifter regions 14. As is shown, near-field light produced through the adjacent data marks 11a and 11b is made clear at boundaries by the presence of a near field light in the minus region due to the phase shifter regions 14 although it has conventionally been unclear at near-field light boundaries due to overlapped foots in near-field light amplitude between adjacent data marks. That is, it becomes possible to separately recognize adjacent data marks.

As described above, according to the recording medium 10 of Embodiment 1, on a base member 16 having a sufficient transmittance for a wavelength of incident light illuminated at the backside of the recording medium 10 where a near-field light information reproducing apparatus adopts a collection mode as a reproducing scheme, a phase shift arrangement layer is provided which is formed alternately with a phase shifter region 14 transparent for the wavelength of the incident light illuminated at the backside of the recording medium 10 to cause 180-degrees shifting in phase of incident light and a transmission region 15 transparent for the wavelength of the incident light. Furthermore, a data mark arrangement layer is formed which can be arranged with a row of data marks 11 in respective positions over the phase shifter regions 14 and the transmission regions 15. A shade film 13 is formed over an area except for areas with data marks 11 and areas that data marks are possible to provide. Accordingly, cancellation is made between spread of near-field light caused on the recording medium 10 due to incident light transmitted through the phase shifter regions 14 and spread of near-field light caused on the recording medium 10 due to incident light transmitted through the transmission regions 14. This makes it possible to improve the contrast of near-field light in the areas of the adjacent data marks 11 or those that the data marks 11 are adjacently provided. Due to this, it is possible to reduce the distance between the adjacent data marks 11 and hence improve recording density.

Embodiment 2

Figure 3:
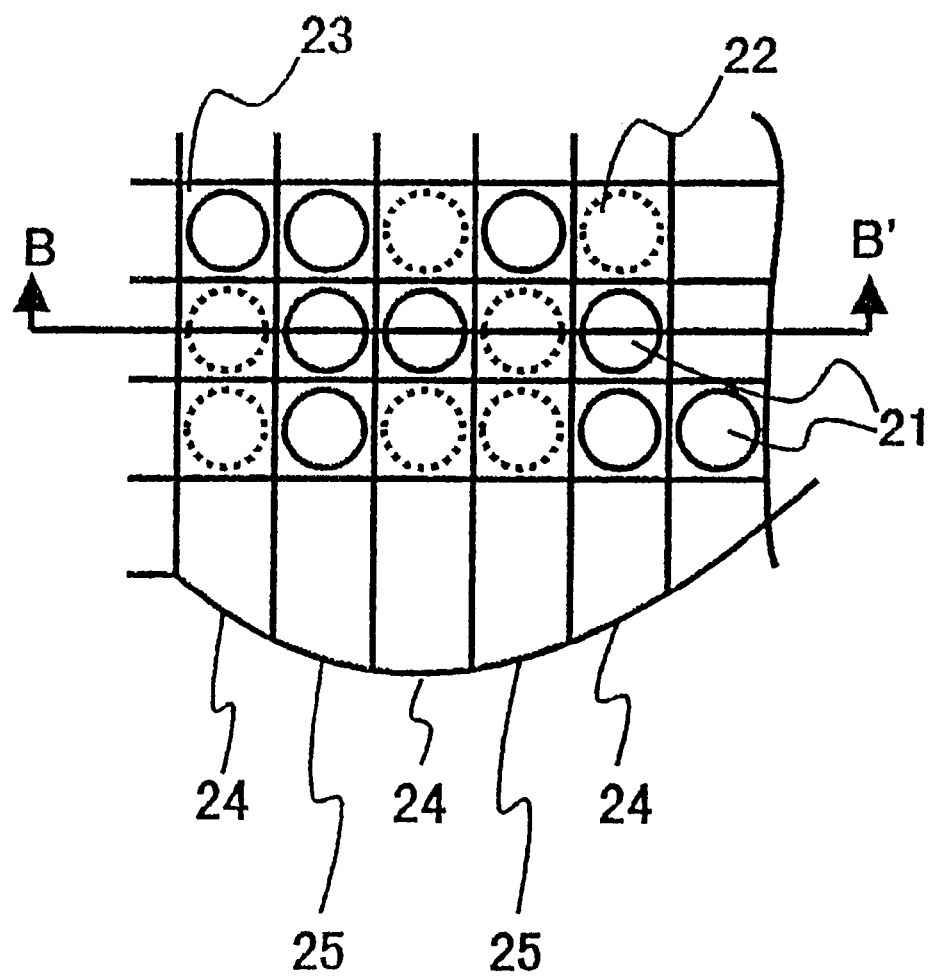
FIG. 3 is an illustrative view showing one part of a recording medium according to Embodiment 2.

Explanations will be now made on a recording medium according to Embodiment 2. FIG. 3 shows one part of the recording medium of Embodiment 2. The recording medium 20 of FIG. 3 is different from the recording medium 10 according to Embodiment 1 only in that no shade film is coated over a surface of the recording medium. Accordingly, the recording medium 20 of FIG. 3 is structured by a phase shifter arrangement layer formed on a base member having a sufficient transmittance for producing near-field light, and a data mark arrangement layer formed on the phase shifter arrangement layer.

Here, the phase shifter arrangement layer is formed alternately with a phase shifter regions 24 and transmission regions 25 similarly to Embodiment 1 while the data mark arrangement layer is a region where data marks 21 are to be formed. Note that circles 22 shown by dotted lines in the figure represent positions that data marks are possible to provide.

Meanwhile, in FIG. 1 the shade film is not formed on the surface in areas except for areas that data marks 21 are possible to provide. Accordingly, in the case that incident light is illuminated at an arbitrary angle with respect to the backside of the recording medium 20 (including a vertical direction) as in Embodiment 1, there is encountered inconvenience that the incident light will appear at the surface. Consequently, there is a necessity of illuminating such incident light to the backside of the recording medium 20 at an angle of total reflection, thereby causing near-field light only due to oozing in the surface of the recording medium 20.

Figure 4:
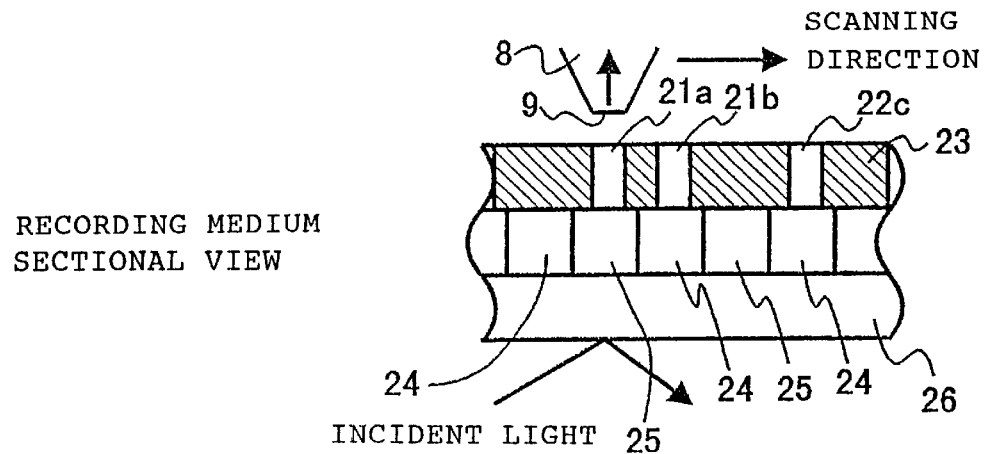
FIG. 4 is an illustrative representation showing a relationship between a sectional view of the recording medium taken on line B–B' in FIG. 3 and near-field light produced through data marks thereof.
Figure 4:
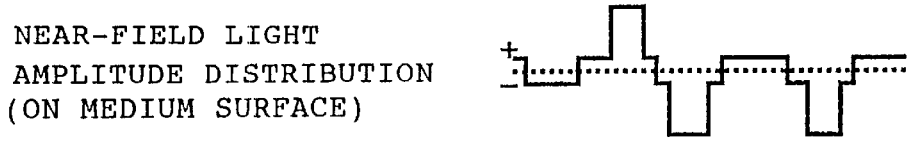
Figure 4:
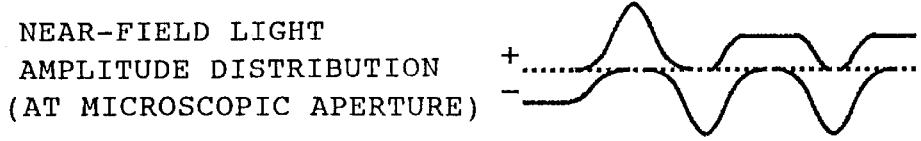
Figure 4:
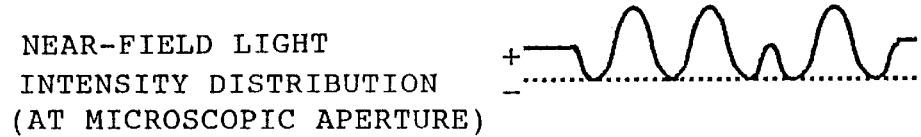

Referring to FIG. 4, there is illustrated a relationship between a sectional view of the recording medium 20 taken on line B–B' in FIG. 3 and near-field light caused through the data marks 21. In the figure, the recording medium 20 is structured by a phase shifter arrangement layer as stated above and a data mark arrangement layer provided thereon, on a base member 26 formed of a sufficiently transmissible material for an oozing portion of the incident light illuminated under a condition of total reflection.

In FIG. 4 a near-field optical probe 8 is also arranged above the recording medium 20, similarly to FIG. 2. The near-field optical probe 8 moves in a rightward direction of the figure as a scanning direction to thereby detect near-field light produced at the data marks 21 arranged on the recording medium 20 in a sequential fashion.

Accordingly, near-field light positioned fully close to the corresponding data marks 21a, 21b, 21c to "1" has an amplitude that can be expressed as a rectangular wave, as ideally shown in near-field light amplitude distribution (on medium surface) of FIG. 4, similarly to FIG. 2. However, the difference from FIG. 2 lies in that there are no regions where the amplitude of near-field light becomes 0 because no shade film exists between the data marks.

With respect to this, the near-field light amplitude distribution (at microscopic aperture) of FIG. 4 shows an amplitude distribution of near-field light reaching the microscopic aperture 9 of the near-field optical probe 8. In this near-field light amplitude distribution (at microscopic opening), there is illustrated a distribution having spreads smoothly attenuated left and right with maximum points on data-mark center axes, i.e. in the plus region for the data mark 21a and in the minus region for the data marks 11b and 11c. Particularly, near-field light at portions where no data mark is positioned is in a form of broad spreading.

Meanwhile, a near-field light intensity distribution (at microscopic aperture) of FIG. 4 illustrates a near-field light intensity distribution offered by the above-stated near-field light amplitude distribution (at microscopic aperture). That is, there is shown an absolute value of a sum of a near-field light amplitude caused on the surface of the recording medium 20 due to incident light passed through the transmission regions 25 and a near-field light amplitude caused on the surface of the recording medium 20 due to incident light passed through the phase shifter regions 24. As is shown, near-field light produced through the data marks 21a and 21b is made clear at boundaries. That is, it becomes possible to separately recognize the adjacent data marks.

As described above, according to the recording medium 20 of Embodiment 2, on a base member 26 having a sufficient transmittance for a wavelength of incident light illuminated at the backside of the recording medium 20 where a near-field light information reproducing apparatus adopts a collection mode as a reproducing scheme, a phase shifter arrangement layer is provided which is formed alternately with a phase shifter region 24 transparent for the wavelength of the incident light illuminated at the backside of the recording medium 20 under a condition of total reflection to cause 180-degrees shifting in phase of the incident light and a transmission region 25 transparent for the wavelength of the incident light. Furthermore, a data mark arrangement layer is formed which can be arranged with a row of data marks 21 in respective positions over the phase shifter regions 24 and the transmission regions 25. Accordingly, cancellation is made between spread of near-field light caused on the recording medium 20 due to incident light transmitted through the phase shifter regions 24 and spread of near-field light caused on the recording medium 20 due to incident light transmitted through the transmission regions 25. This makes it possible to improve the contrast of near-field light in areas of adjacent data marks 21 or those that the data marks 21 are adjacently provided. Due to this, it is possible to reduce the distance between the adjacent data marks 21 and hence improve recording density.

Further, there is no necessity of forming the shade film between the data marks 21. Accordingly it is possible to reduce manufacturing processes for the recording medium and to form adjacent data marks 21 in a closer relationship as compared to the recording medium according to Embodiment 1.

Embodiment 3

Figure 5:
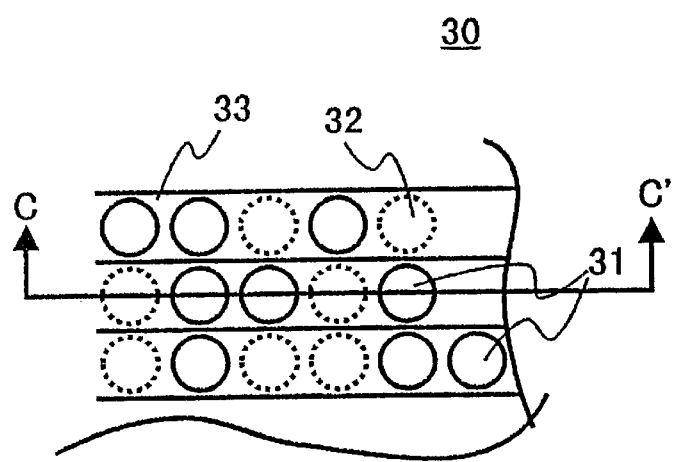
FIG. 5 is an illustrative view showing one part of a recording medium according to Embodiment 3.

Explanations will now be made on a recording medium according to Embodiment 2. FIG. 5 shows one part of the recording medium of Embodiment 3. The recording medium 30 of FIG. 5 has a phase shifter 33 coated on a base member having a sufficient transmittance for producing near-field light, and data marks 31 provided in areas not coated with the phase shifter 33 thus storing information. Note that circles 32 shown by dotted lines represent positions that data marks are possible to provide. Here, the phase shifter 33 has a transmittance of approximately 2–20% for a wavelength of an oozing portion of the incident light illuminated at the backside of the recording medium 30 under a condition of total reflection. The phase shifter is also formed of a translucent material having a phase difference of 180 degrees with respect to the base member 36 of the recording medium 30 (particularly, the translucent phase shifter is referred to as a half-tone type phase shifter), e.g. an applied glass film or sputtered $SiO_2$ film.

Figure 6:
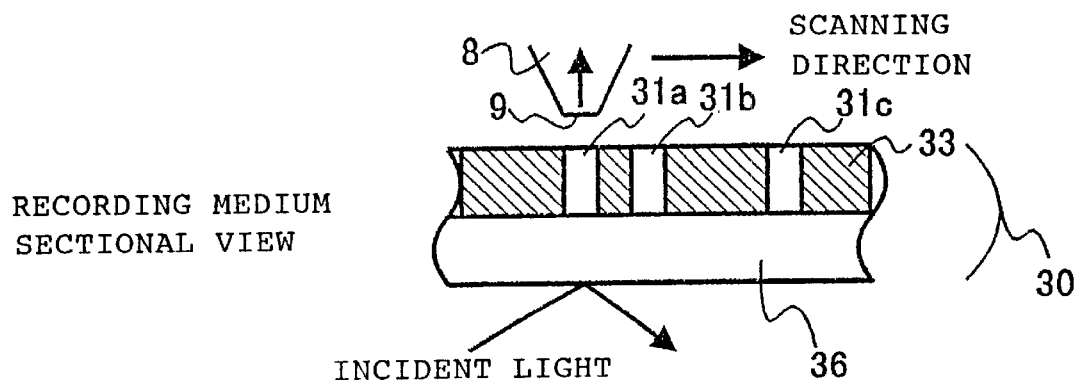
FIG. 6 is an illustrative representation showing a relationship between a sectional view of the recording medium taken on line C–C' in FIG. 5 and near-field light produced through data marks thereof.
Figure 6:
Figure 6:
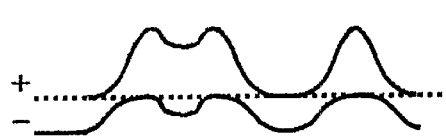
Figure 6:
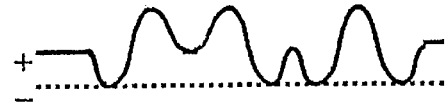

Referring to FIG. 6, there is illustrated a relationship between a sectional view of the recording medium 30 taken on line C–C' in FIG. 5 and near-field light caused through the data marks 31. In the figure, a near-field optical probe 8 is also arranged above the recording medium 30, similarly to FIG. 2. The near-field optical probe 8 moves in a rightward direction of the figure as a scanning direction, thereby sequentially detecting near-field light produced by the data mark 31 on the recording medium 30.

Accordingly, near-field light positioned fully close to the data marks 31a, 31b, 31c has an amplitude that can be expressed as a rectangular wave, as ideally shown in near-field light amplitude distribution (on medium surface) of FIG. 6, similarly to FIG. 2. In this near-field light amplitude distribution (on recording medium), in a minus region represents near-field light produced over the phase shifter 33. That is, near-field light produced over the phase shifter 33 has a phase difference of 180 degrees with respect to near-field light produced over the data marks, and a sufficiently low intensity due to a difference in transmittance as compared to an intensity of near-field light produced over the data marks.

With respect to this, a near-field light amplitude distribution (at microscopic aperture) of FIG. 6 shows an amplitude distribution of a near-field light reaching the microscopic aperture 9 of the near-field optical probe 8. That is, illustrated is an amplitude distribution of near-field light in a position that a given distance is provided between the data mark 31 and the near-field optical probe 8. On the data marks are exhibited spreads smoothly attenuated left and right with maximum points on data-mark center axes in the plus region. In areas that the phase shifter 7 is coated, spreads are exhibited smoothly approaching 0 at edges of data marks or phase shifter 33 in the minus region.

Meanwhile, a near-field light intensity distribution (at microscopic aperture) of FIG. 6 exhibits a near-field light intensity distribution offered by the above-stated near-field light amplitude distribution (at microscopic aperture). That is, there is shown an absolute value of a sum of a near-field light amplitude caused through the data marks 31 and near-field light caused through the phase shifter 33. In the conventional, near-field light created through adjacent data marks 31a and 31b has been obscured at its boundaries because of overlap in foot of near-field light amplitude at the adjacent data marks as is shown. In the embodiment, however, clarity is provided at the boundaries due to a presence of near-field light in the minus region caused through the phase shifter 33. It therefore becomes possible to separately recognize data marks.

As described above, according to the recording medium 30 of Embodiment 3, on a base member 36 having a sufficient transmittance for a wavelength of laser light illuminated at the backside of the recording medium 30 where a near-field light information reproducing apparatus adopts a collection mode as a reproducing scheme, a phase shifter 33 is provided which is translucent for a wavelength of incident light illuminated at the backside of the recording medium 30 under a condition of total reflection to cause shifting in phase of the incident light by 180 degrees. Data marks 31 are provided in apertures not coated by the phase shifter 33. Accordingly, cancellation is made between spread of near-field light at edges of the data marks 31 and spreads of near-field light at edges of the phase shifter 33. This makes it possible to improve the contrast of near-field light through the data marks 31. Due to this, it is possible to reduce the distance between the adjacent data marks 31 and hence improve recording density.

Embodiment 4

Figure 7:
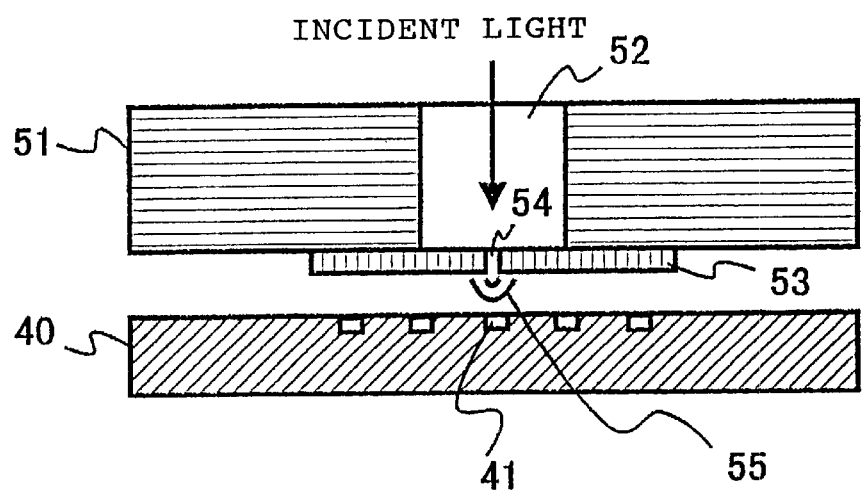
FIG. 7 is a schematic structural view showing a near-field optical probe according to Embodiment 4.

Explanations will now be made on a near-field optical probe according to Embodiment 4. FIG. 7 illustrates a schematic structural view of a near-field optical probe according to Embodiment 4 of the invention. This near-field optical probe is effective particularly for a case of an illumination mode mentioned before. In the figure, a near-field optical probe 50 has a through-hole 52 formed through a planar substrate 51, e.g. of a silicon substrate, through utilizing a semiconductor manufacture process. Meanwhile, a phase shifter 53 is formed over one opening of the through-hole 32 in a manner closing the same. The phase shifter 53 is formed through with a microscopic aperture 54. The microscopic aperture 54 has an appropriate size for producing near-field light, i.e. a diameter of several tens of nanometers.

Here, the phase shifter 53 is a half-tone type phase shifter similar to the phase shifter 33 explained in Embodiment 3. The phase shifter causes incident light, such as laser light, introduced at the opposite opening of the through-hole 52 to be inverted (shifted by 180-degrees) in phase and transmitted through with sufficient attenuation in light intensity. In particular, the phase shifter 53 is required to have a transmittance of nearly one-fifth or lower of the near-field light intensity to be produced at the microscopic aperture 54, which is almost opaque rather than translucent. The transmission light (including near-field light due to oozing effect) is illuminated, together with near-field light produced at the microscopic aperture 54, onto a surface of the recording medium 40.

When near-field light 55 produced at the microscopic aperture 54 is given onto the data mark 41 of the recording medium 40, it undergoes intense scattering due to the data mark 41 thus producing scattering light (propagation light). The scattering light is detected by a not-shown photodetector and converted into a reproduced signal, thus achieving recognition of the data mark 41.

Figure 8:
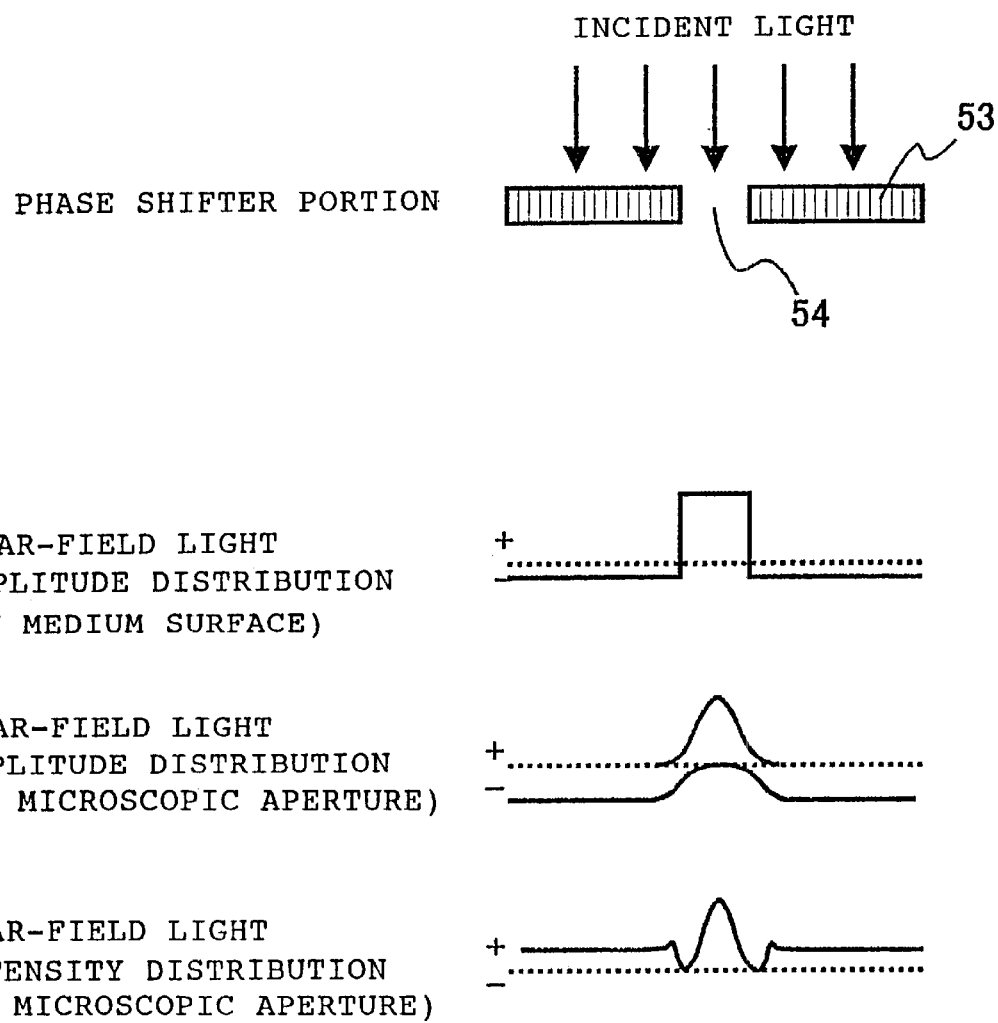
FIG. 8 is an illustrative representation showing a relationship, in the near-field optical probe of Embodiment 4, between a phase shifter portion, propagation light transmitted through a vicinity of a microscopic aperture and near-field light produced through the microscopic aperture.

Referring FIG. 8, there is illustrated a relationship between a part of the phase shifter 53 of the near-field optical probe 50 and propagation light transmitted through a vicinity of the microscopic aperture 54 as well as near-field light produced through the microscopic aperture 54. The amplitude of near-field light in a position fully close to the microscopic aperture 54 can be expressed rectangular as ideally shown in a near-field light amplitude distribution (at microscopic aperture) of FIG. 8. In the near-field light amplitude distribution (at microscopic aperture), in a minus region is shown propagation light transmitted through the phase shifter 53. That is, propagation light transmitted through the phase shifter 53 is inverted in phase by 180 degrees with respect to near-field light produced through the microscopic aperture 54, and has sufficiently low intensity as compared to an intensity of near-field light produced through the microscopic aperture 54.

With respect to this, a near-field light amplitude distribution (on medium surface) of FIG. 8 illustrates an amplitude distribution of near-field light reaching the recording medium 40, that is, an amplitude distribution of near-field light and propagation light in a position that a given distance is provided between the near-field optical probe 50 and the surface of the recording medium 40. As concerned with near-field light 55 is exhibited a spread smoothly attenuating left and right with a maximum point given on a center axis of the microscopic aperture 54 in a plus region. For propagation light is exhibited a spread smoothly approaching 0 at edges of the microscopic aperture 54 or phase shifter 53 in a minus region.

Meanwhile, a near-field light intensity distribution (on medium surface) of FIG. 8 shows a distribution in intensity of near-field light and propagation light offered due to the above near-field light amplitude distribution (on medium surface). That is, shown is an absolute value of a sum of near-field light amplitude produced through the microscopic aperture 54 and propagation light produced through the phase shifter 53. As is shown, near-field light produced through the microscopic aperture 54 is cut in spread of near-field light at the edges of the microscopic aperture 54 due to a presence of propagation light through the phase shifter 53 in the minus region, thus providing near-field light distributed with greater sharpness.

As explained above, according to the near-field optical probe 50 of Embodiment 4, the phase shifter 53 is formed at the opening of the through-hole 52 of the near-field optical probe 50 which is translucent for a wavelength of incident light introduced to the through-hole 52 to cause shifting by 180 degrees in the phase of laser light. Furthermore, the microscopic aperture 54 is formed in the phase shifter 53 to have an appropriate diameter for producing near-field light. Accordingly, in the case that the reproducing scheme to be adopted in a near-field light information reproducing apparatus is taken an illumination mode, cancellation is made between spread in near field light produced through the microscopic aperture 54 and spread in propagation light transmitted through the phase shifter 53, at their respective edges. Thus, it is possible to obtain near-field light with sharpness. This can provide interaction more locally to the data mark 21 arranged on the recording medium 40. It is therefore possible to reproduce information from the recording medium 40 having the data marks 41 recorded with density.

Embodiment 5

Explanation will be now made on a near-field optical probe according to Embodiment 5. FIG. 9 illustrates a schematic structural view of a near-field optical probe according to Embodiment 5 of the invention. This near-field optical probe is effective particularly for a case of an illumination mode, similarly to Embodiment 4. In the figure, a near-field optical probe 60 has a through-hole 62 formed through a planar substrate 61, e.g. of a silicon substrate, through utilizing a semiconductor manufacture process. Meanwhile, the through-hole 62 at its one opening has a shade film 65 to thereby form an aperture. Furthermore, a phase shifter 63 is formed in a manner closing the opening and covering the shade film 65. Sequentially, a microscopic aperture 64 is formed through areas of the phase shifter 63 not provided with the shade film 65 at its under layer e.g. by FIB (Focused Ion Beam). Incidentally, the microscopic aperture 64 is required smaller than the opening of the shade film 65. The shade film 65 aperture and the microscopic aperture 64 are each in an appropriate size for producing near field light, e.g. having a diameter of several tens of nanometers.

Here, the phase shifter 63 is a transparent type shifter to cause inversion (shift by 180 degrees) in the phase of incident light introduced at the other opening of the through-hole 62, allowing incident light to sufficiently transmit through. Due to introduction of incident light, two kinds of incident light are caused, i.e. near field light caused through the opening of the shade film 65 and inverted in phase by transmitting through the phase shifter 63 (referred to as first near field light) and near field light caused through the microscopic aperture 64 (referred to as second near field light).

Particularly, in this case near field light 66 produced through the microscopic aperture 64 is positioned on the data mark 41 of the recording medium 60 to thereby cause scattering light (propagation light). The scattering light is detected by a not-shown photodetector, thus achieving recognition of the data mark 41.

Figure 10:
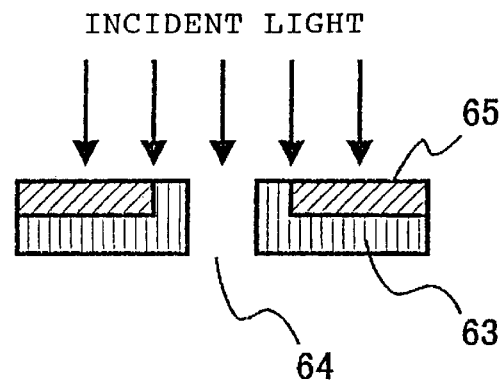
FIG. 10 is an illustrative representation showing a relationship, in the near-field optical probe of Embodiment 5, between first near-field light and second near-field light.
Figure 10:
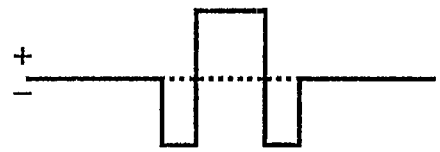
Figure 10:
Figure 10:
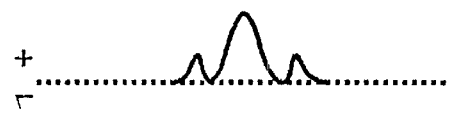
Figure 11:
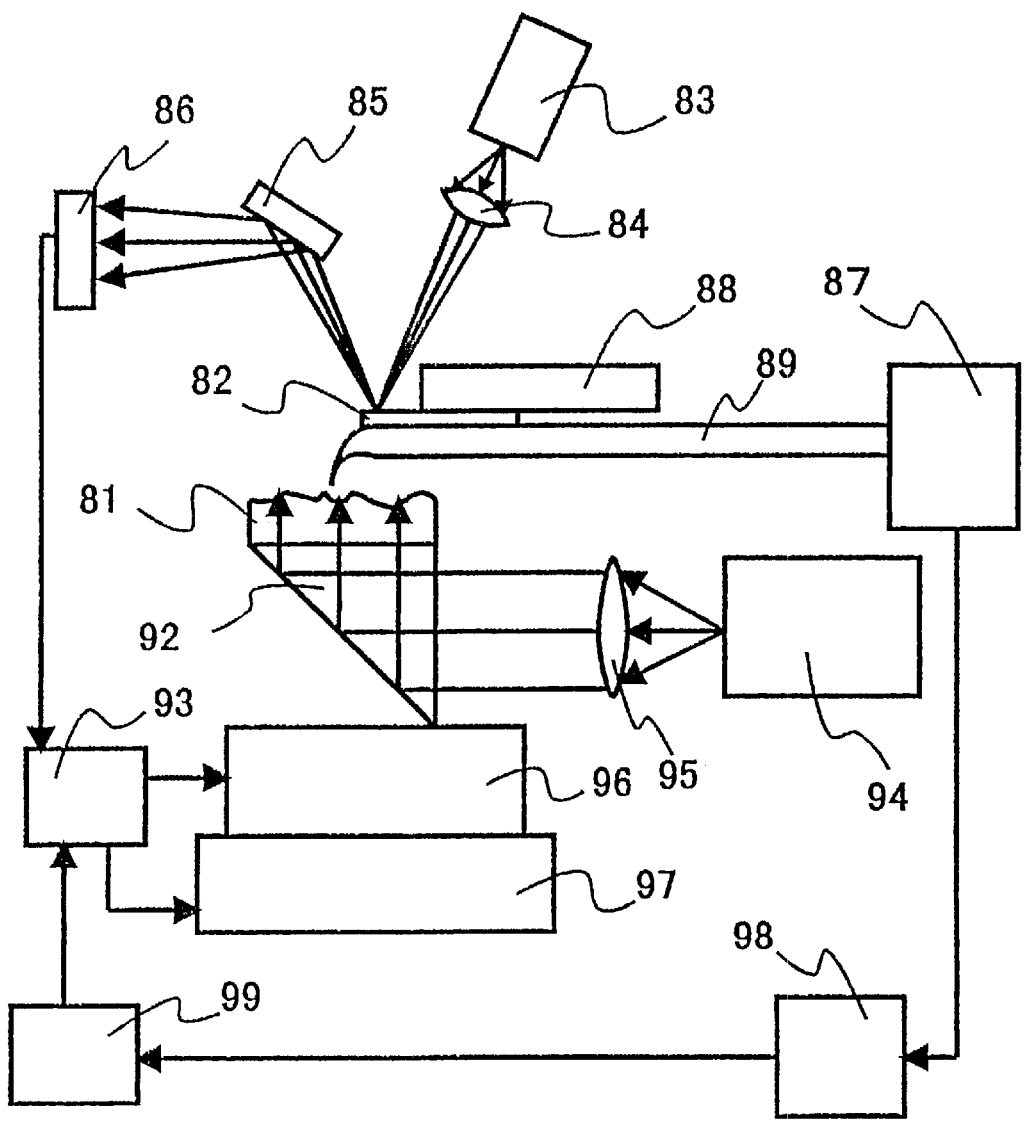
FIG. 11 is a block diagram showing a schematic structure of a conventional scanning near-field atomic force microscope.
Figure 12:
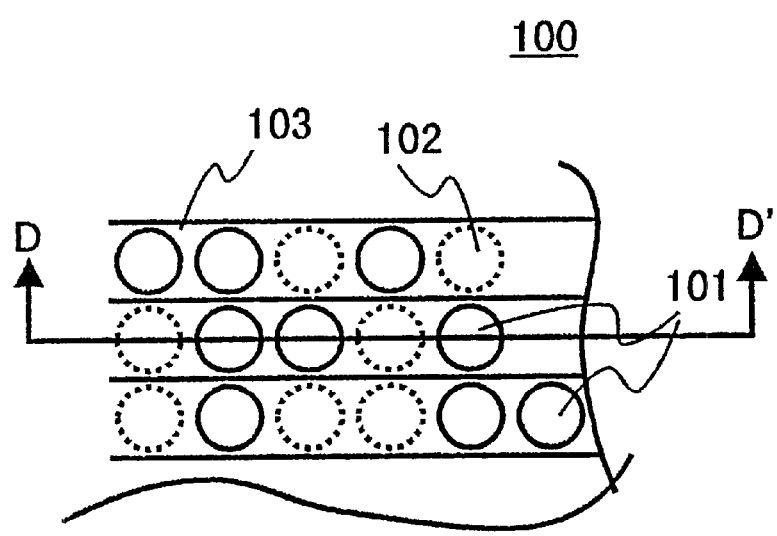
FIG. 12 is an illustrative view showing a conventional recording medium utilizing near-field light.
Figure 13:
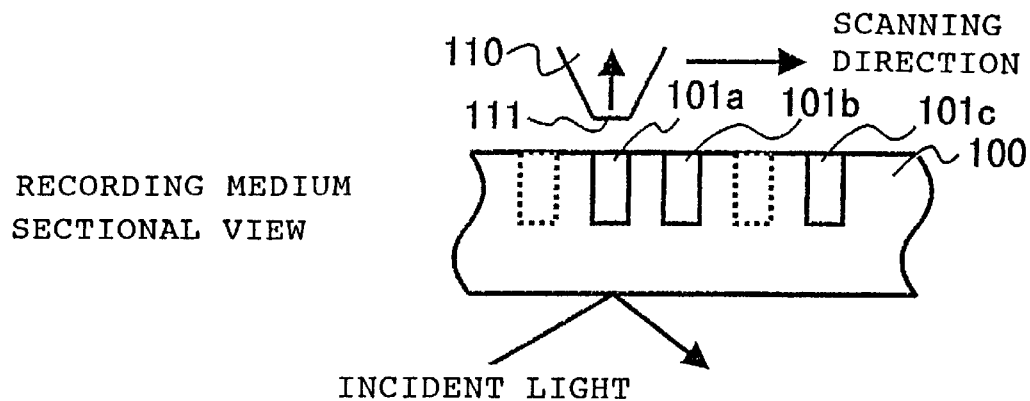
FIG. 13 is an illustrative representation showing a relationship between a sectional view of the recording medium taken on line D–D' in FIG. 12 and near-field light produced through data marks thereof.
Figure 13:
Figure 13:
Figure 13:

Referring FIG. 10, there is illustrated a relationship between above-mentioned first near field light and second near field light. The amplitude of near field light (first near field light and second near field light) in a fully close position to the microscopic aperture 64 can be expressed rectangular as ideally shown in a near-field light amplitude distribution (at microscopic aperture) of FIG. 10. In the near-field light amplitude distribution (at microscopic aperture), in a plus region is shown second near-field light while in a minus region is first near field light. That is, first near field light transmitted through the phase shifter 63 has an inverted phase by 180 degrees with respect to second near field light produced through the microscopic aperture 64.

With respect to this, a near-field light amplitude distribution (on medium surface) of FIG. 10 illustrates an amplitude distribution of near-field light reaching the recording medium 40, that is, an amplitude distribution of first near-field light and second near-field light in a position that a given distance is provided between the near-field optical probe 40 and the surface of the recording medium 40. As concerned with second near-field light is exhibited a spread smoothly attenuating left and right with a maximum point given on a center axis of the microscopic aperture 64 in a plus region. For first near-field light is exhibited a spread smoothly approaching 0 at edges of the phase shifter 63 and shade film 65 in a minus region.

Meanwhile, a near-field light intensity distribution (on medium surface) of FIG. 10 shows a distribution in intensity of first near-field light and second near-field light offered due to the above near-field light amplitude distribution (on medium surface). That is, shown is a sum of near-field light amplitude produced by transmission through the phase shifter 63 and near-field light amplitude produced through the microscopic aperture 64. As is shown, second near-field light is cut in spread of near-field light at the edges of the microscopic aperture 64 due to a presence of first near-field light through the phase shifter 63 in the minus region, thus providing near-field light distributed with greater sharpness.

As explained above, according to the near-field optical probe 60 of Embodiment 5, the opening for causing near-field light is formed by locally coating the shade film 63. The phase shifter 63 is formed in a manner closing the opening, which is transparent for a wavelength of incident light to be introduced to the through-hole 62 to cause shifting by 180 degrees in laser light. The microscopic aperture 64 is provided through the phase shifter 63. Accordingly, in the case that the reproducing scheme to be adopted in a near-field light information reproducing apparatus is taken an illumination mode, cancellation is made between spread in near field light produced through the microscopic aperture 64 and spread in near-field light transmitted through the phase shifter 63, at their respective edges. Thus, it is possible to obtain near-field light with sharpness. This can provide interaction more locally to the data mark 41 arranged on the recording medium 40. It is therefore possible to reproduce information from the recording medium 40 having the data marks 41 recorded with density.

In the above explanations, the near-field optical probe of Embodiment 4 or 5, capable of producing near-field light with local sharpness, can record information with density, for example, to a recording medium which is coated with a phase change film capable of producing from a data mark by a comparatively great intensity of light illumination in addition to reproduction of information on the rewarding medium.

As explained above, according to a first recording medium of the invention, cancellation is made between spread of near-field light caused on the recording medium due to incident light transmitted through the phase shifter regions and spread of near-field light caused on the recording medium due to incident light transmitted through the transmission regions. This makes it possible to improve the contrast of near-field light in the areas that the data marks 21 are adjacently provided. Due to this, an effect is provided wherein a recording medium can be provided which is reduced in distance between the adjacent data marks and hence improved in recording density.

Also, according to a second recording medium of the invention, the shade film is coated on a surface of the data mark arrangement layer in areas except for the data marks and those where data marks are possible to provide. Accordingly, an effect is provided wherein a recording medium can be provided that near-field light only is obtained on a surface of the recording medium for illumination light incidence under other conditions than total reflection.

Also, according to a third recording medium of the invention, cancellation is made between spread of near-field light at edges of the data marks as units of the information being recorded and spreads of near-field light at edges of the phase shifter. This makes it possible to improve the contrast of near-field light through the data marks. Due to this, an effect is provided wherein a recording medium can be provided that the distance is reduced between the adjacent data marks and hence improved in recording density.

Also, according to a first near-field optical probe of the invention, cancellation is made between spread in near field light produced through the microscopic aperture and spread in propagation light transmitted through the phase shifter, at their respective edges. Thus, it is possible to obtain near-field light with sharpness. This can provide interaction more locally to the data mark as information unit arranged on the recording medium. Thus, an effect is provided wherein a near-field optical probe can be provided that information can be reproduced from the recording medium having the data marks recorded with density.

Also, according to a second near-field optical probe of the invention, cancellation is made between spread in first near field light transmitted through the phase shifter and spread in near-field light produced at the second microscopic aperture, at their respective edges. Thus, it is possible to obtain near-field light with sharpness. This can provide interaction more locally to the data mark as information unit arranged on the recording medium. Thus, an effect is provided wherein a near-field optical probe can be provided that information can be reproduced from the recording medium having the data marks recorded with density.

What is claimed is:

1. A recording medium formed on a recording medium surface with information reproducible by utilizing near field light, comprising:
   a medium base member transparent for a wavelength of illumination light to be illuminated to produce the near field light;
   a phase shifter arrangement layer arranged alternately, in a direction parallel with a surface of said medium base member and in a reproducing direction of the information, with transmission regions transparent for the wavelength of the illumination light and phase shifter regions transparent for the wavelength of the illumination light to cause a shift of phase in the illumination light by 180 degrees; and
   a data mark arrangement layer formed on said phase shifter arrangement layer and having data marks as units of the information respectively corresponding one by one to said transmission regions and said phase shifter regions.

2. A recording medium according to claim 1, wherein said data mark arrangement layer has a shade film formed on a surface thereof in regions except for those having said data marks, to shade from the illumination light.

* * * * *